US005434550A

United States Patent [19]

Putt

[11] Patent Number: 5,434,550

[45] Date of Patent: Jul. 18, 1995

[54] ARRESTER DISCONNECTOR

[75] Inventor: Robert E. Putt, Clinton, Ohio

[73] Assignee: Hubbell Incorporated, Orange, Conn.

[21] Appl. No.: 224,327

[22] Filed: Apr. 7, 1994

[51] Int. Cl.[6] ..................... H01H 39/00; H01H 85/00; H02H 1/00

[52] U.S. Cl. ........................................ 337/31; 337/30; 361/125; 200/61.08

[58] Field of Search ........................ 337/30, 31, 32, 33, 337/401, 403, 404, 405, 243; 200/61.08; 361/125, 124, 131, 133, 134

[56] References Cited

U.S. PATENT DOCUMENTS

| | | | |
|---|---|---|---|
| 2,305,394 | 12/1942 | Smith | 337/31 |
| 2,305,436 | 12/1942 | McMorris | 337/31 |
| 2,504,438 | 4/1950 | McFarlin | 337/31 |
| 2,551,858 | 5/1951 | Stoelting et al. | 337/30 |
| 2,607,869 | 8/1952 | Stoelting et al. | 337/30 |
| 2,820,869 | 1/1958 | Hedlund | 337/30 |
| 2,989,608 | 6/1961 | Hicks | 337/31 |
| 3,100,246 | 8/1963 | Riley | 337/30 |
| 3,239,631 | 3/1966 | Snell | 337/30 |
| 3,291,937 | 12/1966 | Carothers et al. | 337/30 |
| 3,702,419 | 11/1972 | Carothers et al. | 361/125 |
| 4,734,823 | 3/1988 | Cunningham | 361/125 |
| 5,057,810 | 10/1991 | Raudabaugh | 337/30 |
| 5,113,167 | 5/1992 | Raudabaugh | 337/30 |

*Primary Examiner*—Leo P. Picard
*Assistant Examiner*—Stephen T. Ryan
*Attorney, Agent, or Firm*—Jerry M. Presson; Mark S. Bicks

[57] ABSTRACT

A device for connecting and then isolating and disconnecting an arrester can be mounted in an insulating bracket. The device includes first and second electrical terminals and first and second electrically conductive washers. The first washer abuts the first terminal. The second washer is spaced from the first washer and from the first terminal. A non-conductive gap spacer is disposed between the two washers and between the second washer and the first terminal. A cartridge with an explosive charge is mounted within the second terminal in its end facing the first terminal. A fuse-link spring extends through aligned openings in the two washers and connects the first terminal to the cartridge.

20 Claims, 2 Drawing Sheets

FIG. 2
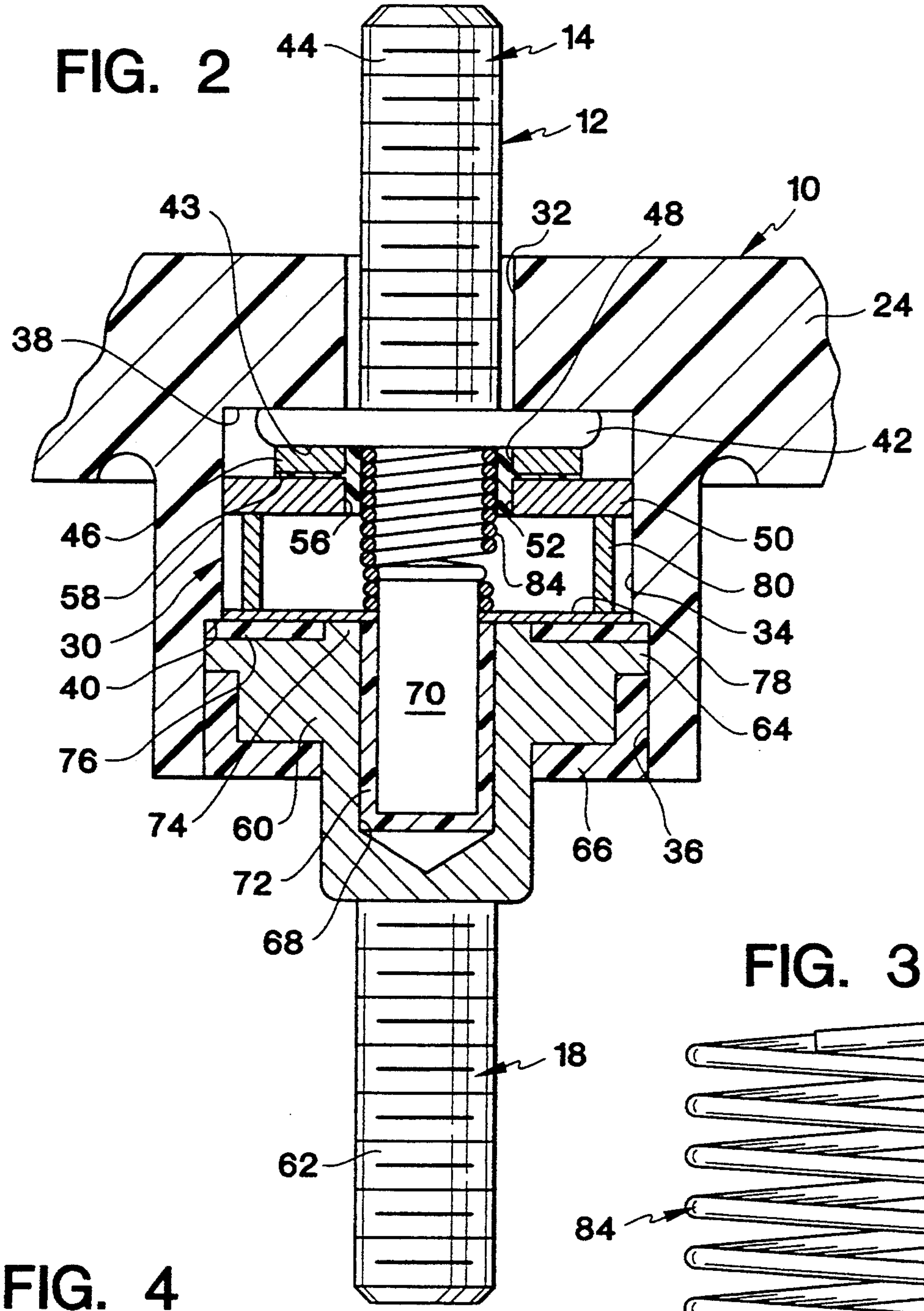
FIG. 3
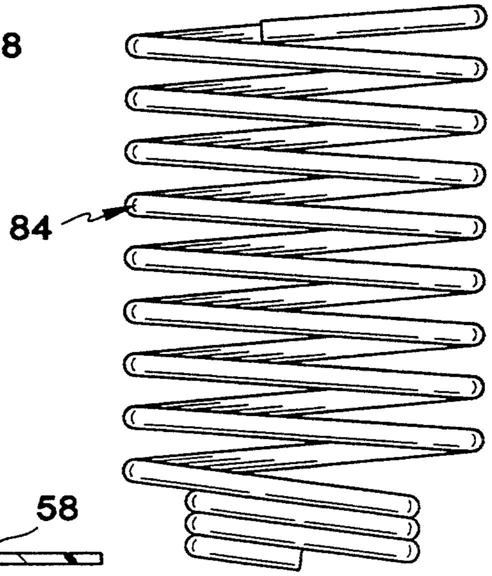
FIG. 4
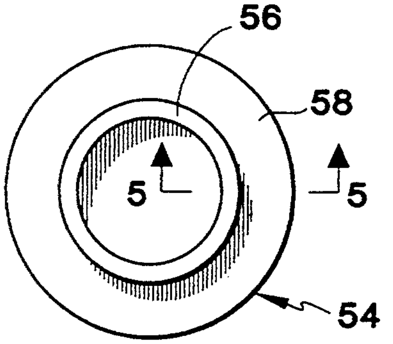
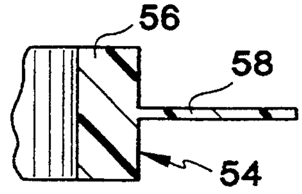
FIG. 5

ARRESTER DISCONNECTOR

FIELD OF THE INVENTION

The present invention relates to a device for mounting or connecting an arrester between a power line and ground during normal arrester operation, and then disconnecting and isolating the arrester from the power line or ground upon arrester failure. More particularly, the present invention relates to an arrester disconnector in an insulating bracket having two electrical paths. One path includes a high resistance spark gap, while the other path includes a separating mechanism for disconnecting and separating the terminals automatically upon arrester failure.

BACKGROUND OF THE INVENTION

Lightning or surge arresters are typically connected to power lines to carry electrical surge currents to ground, and thus, prevent damage to the lines and equipment connected thereto. Arresters offer high resistance to normal voltage across power lines, yet offer very low resistance to surge currents produced by sudden high voltage conditions caused, for example, by lightning strikes. After the surge, the voltage should drop and the arrester should then normally return to a high resistance state. However, upon arrester malfunction or failure, the high resistance state is not resumed, and the arrester continues to provide an electrical path from the power line to ground. Ultimately, the line will fail due to a short circuit condition or breakdown of the distribution transformers, and the arrester will requirement replacement.

To avoid line failure, disconnectors are commonly used in conjunction with arresters to separate a malfunctioning arrester from the circuit and provide visual indication of arrester failure. Conventional disconnectors have an explosive charge to destroy the circuit path and physically separate the electrical terminals.

Examples of prior disconnector devices are disclosed in McMorris U.S. Pat. No. 2,305,436; Smith U.S. Pat. No. 2,305,394; McFarlin U.S. Pat. No. 2,504,438; Stoelting U.S. Pat. Nos. 2,551,858 and 2,607,869; Hedlund et al. U.S. Pat. No. 2,820,869, MacRae U.S. Pat. No. 2,957,967; Hicks U.S. Pat. No. 2,989,608; Robinson U.S. Pat. No. 3,017,539; Riley U.S. Pat. No. 3,100,246; Snell, Jr. U.S. Pat. No. 3,239,631; Carothers et al. U.S. Pat. No. 3,291,937; Carothers U.S. Pat. No. 3,588,773; Irie et al. U.S. Pat. No. 3,668,458; Carothers et al. U.S. Pat. Nos. 3,679,938 and 3,702,419; Cunningham et al. 3,869,650; Stetson U.S. Pat. No. 4,204,238; Barnes U.S. Pat. No. 4,479,105; Sykes et al. U.S. Pat. No. 4,503,414; and Cunningham U.S. Pat. No. 4,734,823.

SUMMARY OF THE INVENTION

An object of the present invention is to provide a device which can be housed in insulation, particularly an insulating bracket, that reliably and sufficiently disconnects a malfunctioning arrester from between a power line and ground, and avoids disconnection before arrester failure.

Another object of the present invention is to provide an arrester disconnector and an insulating mounting bracket including a disconnector that are durable and strong enough to withstand handling during installation, and yet will reliably blow apart upon arrester failure.

The foregoing objects are basically obtained by a device for connecting and then isolating and disconnecting an arrester comprising first and second electrical terminals. A first electrically conductive washer abuts the first terminal and has a first opening therethrough. A second electrically conductive washer is spaced from the first washer and the first terminal, and has a second opening extending therethrough coaxial with the first opening. A non-conductive gap spacer is disposed between the first and second washers and between the second washer and the first terminal. A cartridge with an explosive charge is mounted in the second terminal in its end facing the first terminal. A fuse-link spring extends through the first and second openings connecting the first terminal to the first cartridge.

The foregoing objects are also obtained by an insulating bracket for supporting and connecting an arrester between a power line and ground. The insulating bracket comprises an insulating bracket body having a recess therein, and first and second electrical terminals. Each terminal has a head portion in the recess and a shank portion extending outside of the recess. A first electrically conductive washer in the recess abuts the first terminal head portion and has a first opening extending through it. A second electrically conductive washer in the recess is spaced from the first washer and the first terminal, and has a second opening extending through it coaxial with the first opening. A nonconductive gap spacer in the recess is disposed between the first and second washers, and between the second washer and the first terminal. A cartridge with an explosive charge is mounted in the head portion of the second terminal. A fuse-link spring in the recess extends through the first and second openings and connects the first terminal to the cartridge.

By forming the arrester disconnecting device in this manner, the arrester disconnecting device can be used within a non-conductive housing, but also having the advantages of U.S. Pat. Nos. 5,057,810 and 5,113,167 to Raudabaugh, the subject matters of which are hereby incorporated by reference. Particularly, the concept of U.S. Pat. No. 5,057,810 to Raudabaugh for connecting the two terminals by two parallel electrical circuits is provided. The first circuit includes a high resistance path including a spark over formed by the two washers and gap spacer for high current short duration pulses normally associated with lightning and switching surges. The low resistance or second path includes a fusible member, formed by the fuse-link spring, and a cartridge through which normal low currents can pass during proper arrester operation. However, when the arrester fails, fault currents will melt the fuse-link spring creating a spark gap activating the cartridge and causing an explosion which separates the terminals.

Other objects, advantages and salient features of the present invention will become apparent from the following detailed description, which, taken in conjunction with the annex drawings, discloses a preferred embodiment of the invention.

BRIEF DESCRIPTION OF THE DRAWINGS

Referring to the drawings which form a part of this disclosure:

FIG. 2 is an enlarged, partial, side elevational view in section of the insulating bracket of FIG. 1, illustrating the arrester disconnector structure;

FIG. 3 is an enlarged, side elevational view of the fuse-link spring of the insulating bracket of FIG. 2;

FIG. 4 is a top plan view of the non-conductive gap spacer of the insulating bracket of FIG. 2; and FIG. 5 is a front elevational view in section taken along lines 5—5 of FIG. 4 of the non-conductive gap spacer of the insulating bracket of FIG. 2.

DETAILED DESCRIPTION OF THE INVENTION

Figure 1:
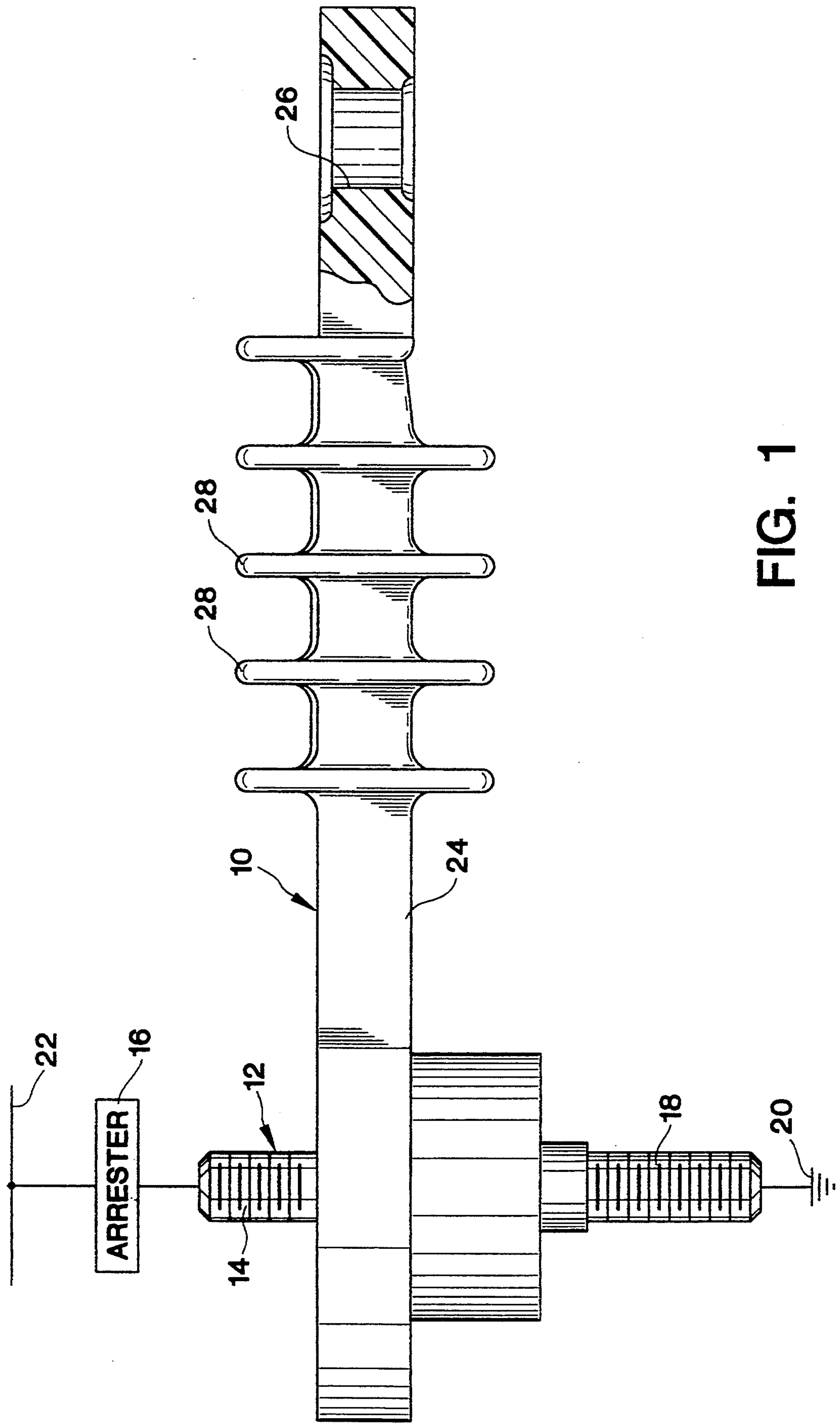
FIG. 1 is a side elevational view, partially in section, of an insulating bracket according to the present invention.

Referring initially to FIG. 1, an insulating bracket 10 includes an arrester isolator or disconnector assembly or device 12 adjacent one of its ends. Disconnector 12 includes a first, upper electrically conductive terminal 14 electrically connected to an arrester 16 and a second, lower electrically conductive terminal 18 electrically connected to ground 20. Arrester 16 is electrically connected to a power line 22 which is representative of a power system. Terminals 14 and 18 are mechanically and electrically coupled to each other.

Arrester 16 is conventional, and thus, is not described in detail. The arrester can be formed according to U.S. Pat. No. 4,656,555 to Raudabaugh, the subject matter which is hereby incorporated herein by reference.

Insulating bracket 10 includes a body 24. The body is formed of any suitable insulating material, such as plastic. Disconnector 12 is located adjacent one end of the body. The opposite end of the body includes a through bore 26 for mounting the bracket on a structure, such as a utility pole, transformer or other electrical apparatus. Between disconnector 12 and mounting bore 26, body 24 has a plurality of radially outwardly extending weathersheds of conventional design.

Referring now to FIGS. 2–5, the details of disconnector 12 will be described, with particular reference to FIG. 2. Disconnector 12 is mounted within a recess 30 in insulating body 24. The recess comprises an upper cylindrical bore 32, an upper cylindrical chamber 34 and a lower cylindrical chamber 36. Upper bore 32 and upper chamber 34 are separated by the top end surface 38 of the upper chamber. The upper and lower chambers are separated by an annular shoulder 40 extending radially inwardly from body 24 into recess 40. Lower chamber 36 has a substantially constant transverse diameter along its axial length, and opens to the outside in a downward direction.

Electrical terminal 14 is a metallic stud. The stud can be plated with zinc. The stud has a head portion 42 located within upper chamber 34 of recess 30 and has an externally threaded shank portion 44 extending from head portion 42 through upper bore 32, such that shank portion 44 is at least exposed partially on the exterior of body 24. The axial end surface 43 of head portion 42 adjacent shank portion 44 engages end surface 38. The opposite axial end surface 43 of head portion 42 faces the interior of recess 30.

A stainless steel gap washer 46 overlies and engages the axial end face 43 of head portion 42 directed toward the interior of recess 30 in upper chamber 34. Gap washer 46 is preferably formed of stainless steel. The opening 48 extending through the gap washer is essentially coaxial with the longitudinal axis of terminal 14.

A second or isolator washer 50 is also located in upper chamber 34 of recess 30, but is spaced from gap washer 46 and from first electrical terminal 14. Gap washer 46 is located between terminal head portion 42 and isolator washer 50. Isolator washer 50 has an opening 52 coaxial with the gap washer opening 48. The isolator washer is formed of a suitable conductive material or metal.

A gap spacer 54 is disposed between gap washer 46 and isolator washer 50 and between isolator washer 50 and first electrical terminal 14. The gap spacer comprises a cylindrical portion 56 extending through washer openings 48 and 52, with one axial end face abutting terminal head portion 42. A thin annular flange 58 extends radially outwardly from the cylindrical portion and between gap washer 46 and isolator washer 50. In this manner, annular flange 58 spaces the two washers to define a spark gap therebetween.

The free end edge of the annular flange must be sharp and flash free to avoid adversely affecting operation across the spark gap. The thickness of the annular flange 58 is approximately 0.0100 inches.

Preferably, gap space 54 is molded of acetal. Acetal resins are very strong and stiff thermoplastics, and are characterized by good fatigue length, resilience, low moisture sensitivity, high solvent and chemical resistance and good electrical properties. Additionally, acetal evolves gas when exposed to high temperatures.

Second electrical terminal 18 comprises a stud, preferably formed of stainless steel, having a head portion 60 and a shank portion 62. Shank portion 62 is externally threaded to facilitate connection of terminal 18 to ground 20. The head portion is completely inserted within lower chamber 36 of recess 30. A peripheral flange 64 extending laterally outwardly from head portion 60 fits within lower chamber 36 with a slight interference fit. A gasket 76 is mounted on the upper surface of the second terminal head portion 60 and overlies peripheral flange 64. The gasket is preferably formed of rubber. Second terminal 18, with gasket 76, is inserted with recess 30 from the lower surface of bracket body 24 (as viewed in FIG. 2) until the gasket abuts annular shoulder 40. Engagement of annular shoulder 40 and gasket 76 properly locates head portion 60 within recess 30 and seals lower chamber 36 from upper chamber 34. When the head portion has been fully inserted within the recess, the second terminal is secured to body 24 by epoxy adhesive 66. The seal provided by gasket 76 prevents epoxy adhesive from entering upper chamber 34 to avoid adverse affects on the spark gap formed by washers 46 and 50.

Shank 62 extends out of the recess to the exterior of bracket body 24 to facilitate connection to ground 20.

A blind bore 68 is formed in second terminal head portion 60 and opens toward to the interior of the recess (i.e., toward first terminal 14). The blind bore receives a cartridge 70 with an explosive charge, which cartridge is encased within an insulator sleeve 72. Sleeve 72 is preferably formed of plastic. Cartridge 70 preferably comprises a 22 caliber blank. Surrounding cartridge 70 and sleeve 72, second terminal head portion has an annular boss 74 extending upwardly from its upper surface and through the opening in gasket 76.

An isolator spring 78 of electrically conductive material overlies and engages second terminal boss 74 and gasket 76. Preferably, the isolator spring is formed of bronze.

Isolator washer 50 is connected to isolator spring 78 by an electrically conductive isolator spacer 80. Isolator spacer 80 is formed of a suitable electrically conductive material to electrically connect isolator washer 50 to second terminal 18 through isolator spring 78. Spacer 80 is generally is the form of a right circular cylinder, with its axial ends abutting adjacent surfaces of isolator washer 50 and isolator spring 78. The outside surface of isolator spacer 80 is spaced inwardly from the adjacent interior surfaces defining upper chamber 34 of recess 30.

Cartridge 70 is coupled electrically to isolator spring 78 by the friction or interference fit of cartridge 70 within the smaller diameter of the central opening in isolator spring 78.

A fuse-link spring 84, illustrated in detail in FIG. 3, electrically connects first terminal 14 to cartridge 70 and to isolator spring 78, and through isolator spring 78 and second terminal 18. The upper axial end portion of spring 84 extends through the hollow interior of cylindrical portion 56 of gap spacer 54, separating spring 84 from washers 46 and 50. The upper axial end surface of spring 84 abuts the exposed axial end surface 43 of first terminal head portion 42. The narrower, lower end of the fuse-link spring is wrapped about the upper portion of cartridge 70 to engage and electrically connect the fuse-link spring to both the cartridge and isolator spring 78.

Spring 84 can be formed of a stainless compression spring. To allow it to behave as a fuse wire or a fuse-link, the fuse value may be adjusted by choosing various wire gauges or spring materials . Larger wire requires more current time, while finer wire requires less current time, to melt the fuse. Typically, the fuse-link spring is selected to be operable at $I^2t$ of less than 150 amp$^2$-seconds.

Once disconnector device 12 is fully assembled within isolator bracket body 24, the disconnector is electrically coupled to arrester 16 through electrical terminal 14 and to ground 20 through electrical terminal 18, according to conventional practice. The normal low current passing through arrester 16 flows through a low resistance path or circuit in disconnector 12. The low resistance path includes electrical terminal 14, fuse-link spring 84, isolator spring 78 and electrical terminal 18. Steady state arrester currents are usually less than one milliampere and pass through the low resistance path or circuit without melting fuse-link spring 84, and thus, without activating the disconnecting components of disconnector 12.

When exposed to lightning or switching surge currents, the arrester experiences extremely high pulse currents which travel through a higher resistance path or circuit within disconnector 12. The higher resistance path or circuit includes electrical terminal 14, gap washer 46, isolator washer 50, isolator spacer 80, isolator spring 78 and electrical terminal 16. The higher resistance is produced by the gap spacer 54 which defines a spark gap between gap washer 46 and isolator washer 50. The gap sparks over for high current, short duration pulses which last usually less than one hundred milliseconds for lightning and less than several milliseconds for switching currents. The protective gap will spark over at about 700 to 2000 volts.

In the preferred embodiment, the gap is about 0.010 inches. Using average electrical parameters, the gap will spark over currents exceeding 1500 amperes. For tens to tens of thousands of amperes experienced in lightning charges, the protective gap is sparked over rapidly and the duration of the arc voltage is extremely short. In the case of switching surges, the current is usually insufficient to activate the protective gap.

The gap zone is designed with one washer larger than the other washer to protect the edges of the gap washer 46 from damage during disconnector manufacture and handling. By locating the spark over gap within the protection of recess 30 of bracket body 24, the gap is protected from contamination from the environment.

Steady state arrester currents travel through the low resistance path. If the lightning arrester fails to withstand such voltage, short circuit currents of tens to tens of thousands of amperes may flow through the faulted arrester. In disconnector 12, fault currents passing through fuse-link spring 84 cause the spring to behave as a fuse wire.

Prolonged passage of fault current through the fuse-link spring melts the fuse-link spring and forms a second spark gap. The second spark gap formed in upper chamber 34 draws an arc activating the unprimed cartridge 70 and causing an explosion which separates one terminal from the other. The force of the exploded charge forces at least one of the terminals, usually second terminal 18, from recess 30. This action disconnects the arrester from the system, and provides a visual indication of the need for arrester replacement.

In situations of high pulse current, the fuse-link spring only experiences protective gap arc voltage for a very short time period. This short time period is insufficient to activate or melt the fuse-link spring.

Power frequency volt currents below 1500 amperes will directly contribute to the fusing of link spring 84. Powerful currents above this level will establish a bypass arc, but the duration of this arc and the arc voltage magnitude will be sufficient to activate the fuse-link in an acceptable time period. At very low volt currents, tens of amperes and less, the current may not be sufficient to melt fuse-link spring 84 before cartridge 70 explodes. However, just raising the cartridge temperature to several hundred degrees fahrenheit will cause detonation and disconnection. The primary motive for detonation is heating by exposure to an arc drawn by failing fuse 84.

While one embodiment has been chosen to illustrate the invention, it will be understood by those skilled in the art that various changes and modifications can be made therein without departing from the scope of the invention as defined in the appended claims.

What is claimed is:

1. A device for connecting and then isolating and disconnecting an arrester, comprising:
- a first electrical terminal;
- a second electrical terminal;
- a first electrically conductive washer abutting said first terminal and having a first opening extending therethrough;
- a second electrically conductive washer spaced from said first washer and said first terminal and having a second opening extending therethrough coaxial with said first opening;
- a non-conductive gap spacer disposed between said first and second washers and between said second washer and said first terminal;
- a cartridge with an explosive charge mounted in said second terminal in an end thereof facing said first terminal; and
- a fuse-link spring extending through said first and second openings connecting said first terminal to said cartridge.

2. A device according to claim 1 wherein said gap spacer comprises a cylindrical portion extending through said first and second openings between said fuse-link spring and said first and second washers, and an annular flange extending radially and laterally outwardly from said cylindrical portion between said first and second washers.

3. A device according to claim 1 wherein an isolator spacer connects said second washer to said second terminal.

4. A device according to claim 3 wherein said isolator spacer comprises a hollow cylinder surrounding said fuse-link spring and extending axially between said second washer and said second terminal.

5. A device according to claim 1 wherein said cartridge is mounted in a recess in said second terminal.

6. A device according to claim 5 wherein an insulating sleeve separates said cartridge from said second terminal.

7. A device according to claim 6 wherein a conductive spring electrically connects said fuse-link spring to said second terminal.

8. A device according to claim 7 wherein an isolator spacer connects said second washer to said conductive spring.

9. A device according to claim 1 wherein portions of said first and second terminals, said first and second washers, said gap spacer, said cartridge and said fuse-link spring are housed in an non-conductive member.

10. An insulating bracket for supporting and connecting an arrester between a power line and ground, comprising:

an insulating bracket body having a recess therein;

a first electrical terminal having a head portion in said recess and a shank portion extending outside of said recess;

a second electrical terminal having a head portion in said recess and a shank portion extending outside of said recess;

a first electrically conductive washer in said recess abutting said head portion of said first terminal and having a first opening extending therethrough;

a second electrically conductive washer in said recess spaced from said first washer and said first terminal and having a second opening extending therethrough coaxial with said first opening;

a non-conductive gap spacer in said recess disposed between said first and second washers and between said second washer and said first terminal;

a cartridge with an explosive charge mounted in said head portion of said second terminal; and a fuse-link spring in said recess extending through said first and second openings connecting said first terminal to said cartridge.

11. An insulating bracket according to claim 10 wherein said gap spacer comprises a cylindrical portion extending through said first and second openings between said fuse-link spring and said first and second washers, and an annular flange extending radially and laterally outwardly from said cylindrical portion between said first and second washers.

12. An insulating bracket according to claim 10 wherein an isolator spacer in said recess connects said second washer to said second terminal.

13. An insulating bracket according to claim 12 wherein said isolator spacer comprises a hollow cylinder surrounding said fuse-link spring and extending axially between said second washer and said second terminal.

14. An insulating bracket according to claim 10 wherein said cartridge is mounted in a recess in said second terminal.

15. A insulating bracket according to claim 14 wherein an insulating sleeve separates said cartridge from said second terminal.

16. An insulating bracket according to claim 15 wherein a conductive spring in said recess electrically connects said fuse-link spring to said second terminal.

17. A insulating bracket according to claim 16 wherein an isolator spacer in said recess connects said second washer to said conductive spring.

18. An insulating bracket according to claim 10 wherein said bracket body comprises mounting means for attaching said body to another structure spaced from said recess.

19. An insulating bracket according to claim 18 wherein said bracket body comprises weathersheds between said recess and said mounting means.

20. An insulating bracket according to claim 10 wherein at least one end of said recess receives one of said head portions and has a transverse diameter greater than said one of said head portions; and an adhesive couples said one of said head portions to said bracket body.

* * * * *